United States Patent
Newman

(10) Patent No.: US 7,061,503 B2
(45) Date of Patent: Jun. 13, 2006

(54) IN-GAMUT COLOR PICKER

(75) Inventor: Todd Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 10/184,886

(22) Filed: Jul. 1, 2002

(65) Prior Publication Data

US 2004/0001072 A1 Jan. 1, 2004

(51) Int. Cl.
G09G 5/02 (2006.01)

(52) U.S. Cl. .................................. 345/593; 345/591

(58) Field of Classification Search ................ 345/22, 345/549, 589–594, 122, 169, 212; 358/3.23, 358/500, 518–523
See application file for complete search history.

(56) References Cited

U.S. PATENT DOCUMENTS 5,416,890 A * 5/1995 Beretta ....................... 345/590
6,421,141 B1 * 7/2002 Nishikawa ................. 358/1.9

OTHER PUBLICATIONS

Braun and Fairchild, "Techniques for Gamut Surface Definition and Visualization", The Fifth Color Imaging Conference: Color Science, Systems, and Applications, pp. 147–152, Rochester Institute of Technology, Rochester, New York.
"Adobe Photoshop Basics Lesson 3b: The Color Picker", 4 pages URL: http://www.graphicssoft.about.com/library/course/bllps503b.htm (Site visited Jun. 28, 2002).

* cited by examiner

Primary Examiner—Matthew C. Bella
Assistant Examiner—G. F. Cunnigham
(74) Attorney, Agent, or Firm—Fitzpatrick, Cella, Harper & Scinto

(57) ABSTRACT

A user interface for an application program which displays documents having colored objects on a working output device such as a CRT, and which outputs the document to a target output device such as a printer that has a color gamut different from that of the working output device. The user interface allows selection from among multiple different colors. The user interface of the present invention includes a region that displays multiple different colors or colored objects, at least some of which are selectable by the user, wherein for these selectable colors or colored objects, only in-gamut colors are displayed.

13 Claims, 8 Drawing Sheets

(3 of 8 Drawing Sheet(s) Filed in Color)

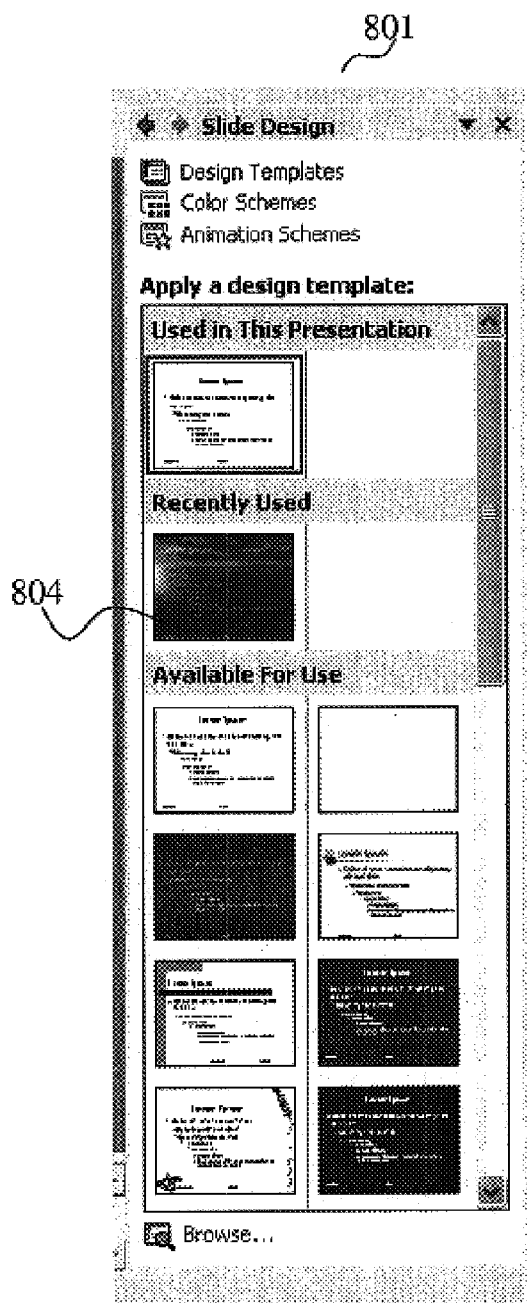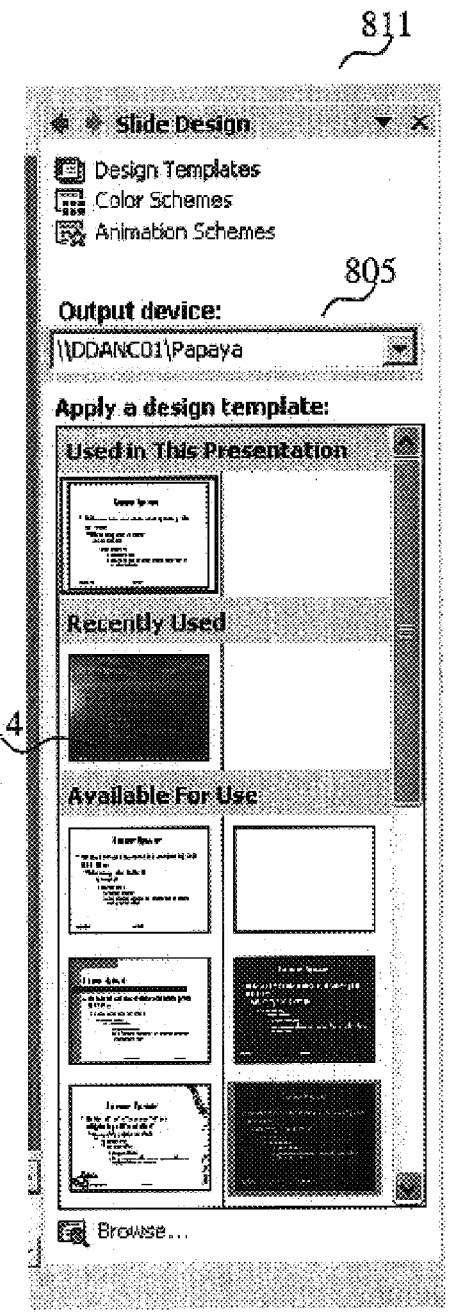
Fig. 8A
Fig. 8B

Fig. 9A
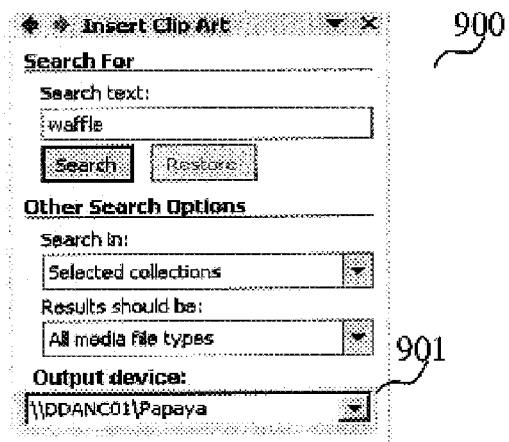
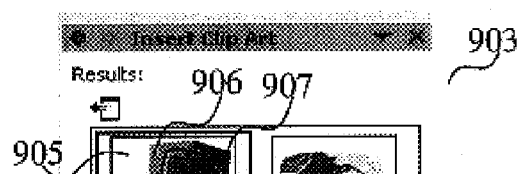
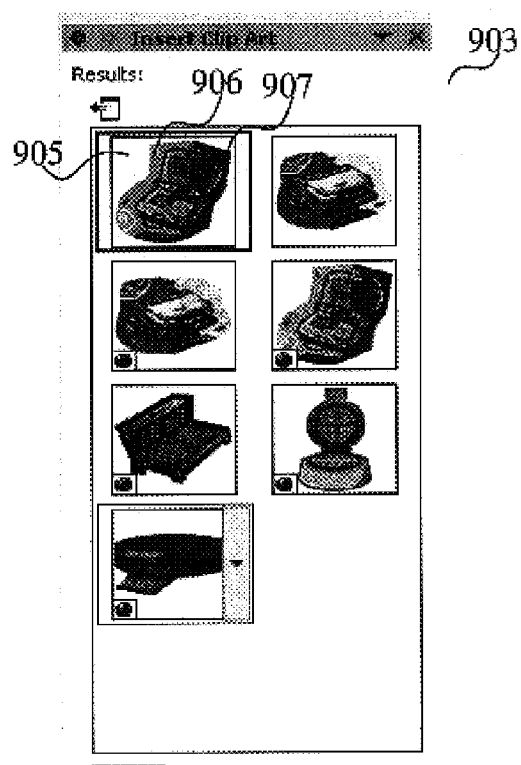
Fig. 9B
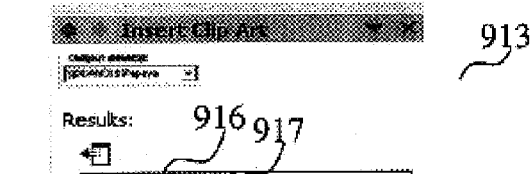
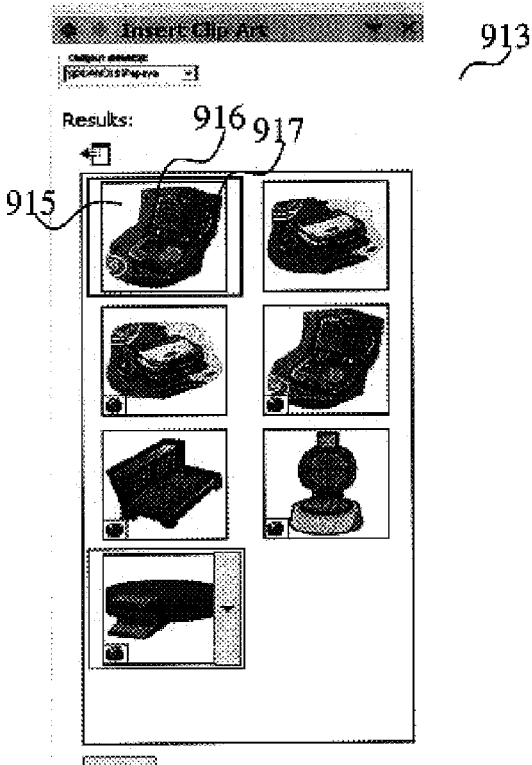
Fig. 9C

IN-GAMUT COLOR PICKER

BACKGROUND OF THE INVENTION

1. Field of the Invention

The present invention relates to a user interface by which a computer user picks colors for use in computerized documents, and particularly relates to a user interface which displays colors selectable by the user such that for the selectable colors, only in-gamut colors are displayed.

2. Description of the Related Art

Application programs for document creation have become increasingly sophisticated in their incorporation of color into the document. Such document creation tools include word processors such as Microsoft® Word and Corel® WordPerfect®, presentation tools such as Microsoft's PowerPoint® and Corel's CorelDRAW®, and even database and spreadsheet programs.

Typical users of such application programs are often disappointed by the color quality obtained when the final document is printed or otherwise output. One reason for this is that the users are creating their document on one output device (usually a CRT monitor or LCD display), whereas the final presentation of the document is on another output device, such as printed by a printer on paper or projected with a video projector. It is well known that there are significant differences between the gamut of colors producible by these different output devices. A user, however, might unwittingly select colors that are within the gamut of his monitor but outside the gamut of the output device. Thus, colors outside the gamut of the output device are adjusted when output, and users often do not like the final result.

For simplicity in terminology, the output device on which the user creates his document (such as a CRT monitor or LCD display) will hereinafter be referred to as "working output device", whereas the output device for the final document (such as a printer or projector) will hereinafter be referred to as "target output device".

One solution commonly offered is called "print preview" or "soft proof". Here, the user is allowed to preview, on the working output device, colors as they would appear when output by the target output device. One problem with this approach is that although the user can preview the output, he still might dislike the result.

Another proposal offered in more sophisticated software is an "out-of-gamut warning". For example, later versions of Adobe's Photoshop program provide an out-of-gamut warning when a user selects a color displayable on a monitor but not printable by a printer. In addition, the closest in-gamut color is displayed. Like the aforementioned soft-proofing process, however, this approach has a drawback in that nothing is done to prevent the user from selecting an out-of-gamut color. Accordingly, if the warning is ignored, or if (more commonly) the warning is not well-understood, the user will select a color that is not in-gamut for the target output device and will likely be displeased with the result.

SUMMARY OF THE INVENTION

It is an object of the present invention to address the foregoing difficulties and drawbacks in the prior art, by providing a user interface for a color picker which allows a user to select from among multiple different colors, and in which for selectable ones of the colors, only colors in-gamut for the target output device are displayed.

The displayed colors might be obtained through gamut mapping based on a device profile for the target output device or it might be a generalized gamut representative of common output devices.

Because colors selectable by the user are displayed in their in-gamut appearance, use of the invention largely avoids the problems described above since the user will ordinarily select only colors that are in-gamut to the target output device. Thus, the user is making his selection of colors based on the appearance of colors at the target output device, and will therefore know at the time of selection whether the colors are acceptable to him.

Thus, in one aspect, the invention is a user interface for an application program which displays documents having colored objects on a working output device and which outputs the document to a target output device having a color gamut that differs from that of the working output device. The user interface permits user selection from multiple different colors, and includes a region that displays multiple different selectable colors or colored objects, wherein for such selectable colors or colored objects, only in-gamut colors are displayed.

Thus, a user can select from multiple different colors or multiple colored objects. A colored object, for which only in-gamut colors are displayed, may comprise a document containing colored objects or other colored objects such as clip art, for example. A template or clip art object comprises one or more colors, and for selectable templates or clip art only in-gamut colors are displayed.

According to further and preferred aspects of the invention, the user interface includes a second region for display of the target output device, and the target output device might be selectable from among plural different output devices. A third region might display colors that are not selectable, and those colors might be in-gamut or out-of-gamut in dependence on the overall purpose of the user interface.

Preferably, the output device is a color printer or projector, and in-gamut colors are obtained through gamut mapping using a device profile for the target output device. Gamut mapping in this instance is most readily performed through a color look-up table. Alternatively, other techniques might be employed for obtaining the in-gamut colors. One such other technique, for example, might be use of a representative gamut for common output devices, which is roughly representative of the actual target output device without being specific to it.

In further preferred aspects, the application program itself responds to color selection from the user interface by displaying only in-gamut colors, rather than by displaying colors as they might otherwise appear on the working output device. This arrangement is preferred since the overall user experience is much closer to WYSIWYG, and does not cause user confusion that might otherwise result if a user selects an in-gamut color which suddenly appears differently when viewing the color document on the working output device.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8, which comprises FIGS. 8A and 8B, depicts templates each using in gamut colors of a target output device and each having an associated color palette displayable in user interface 301 for selection by the user according to the present invention.

FIG. 9, which comprises FIGS. 9A, 9B and 9C, illustrate clip art which has been modified so that the clip art colors fall within the gamut of a target output device according to the present invention.

DETAILED DESCRIPTION OF THE PREFERRED EMBODIMENTS

Figure 1:
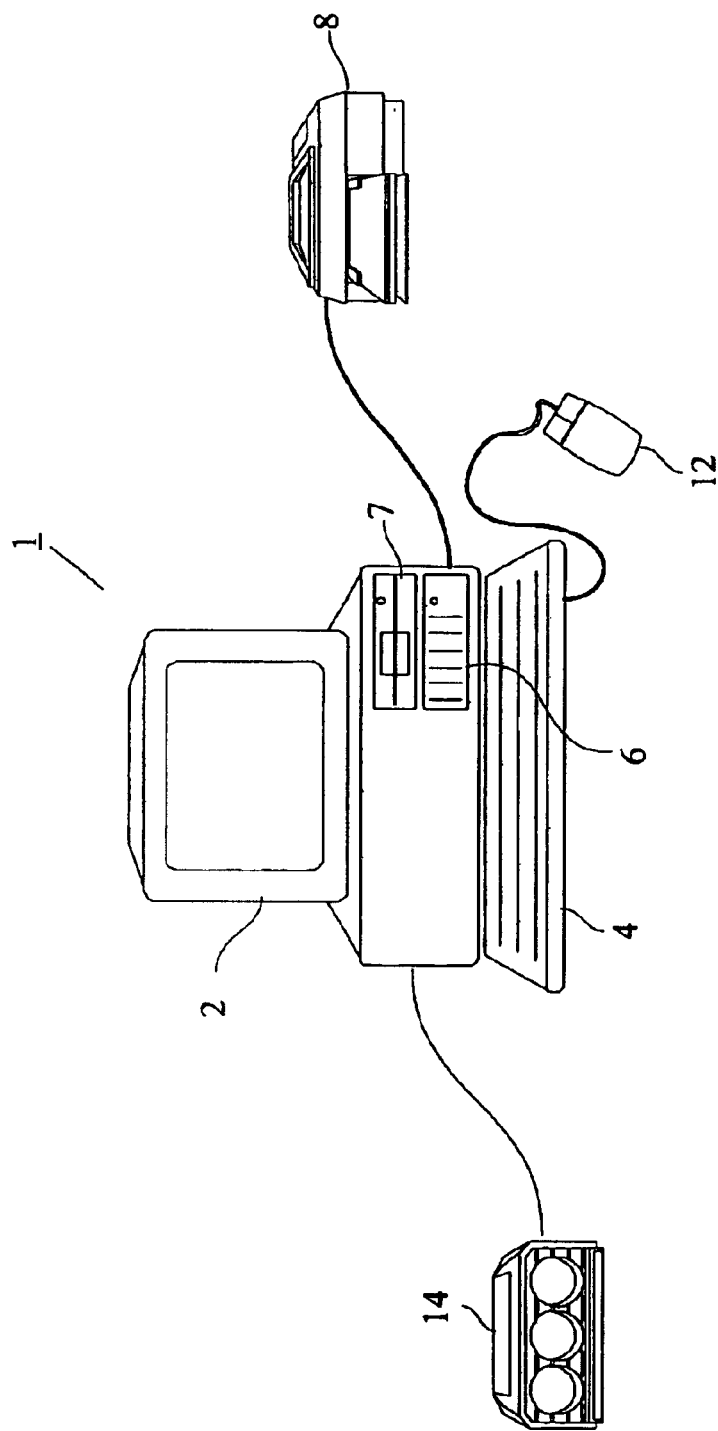
FIG. 1 is an outward view of a hardware environment embodying the present invention.

FIG. 1 is an outward view of representative computing hardware embodying the present invention. Shown in FIG. 1 are computer 1 executing an operating system, such as Microsoft WindowsXP®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as a word processing, graphics or Internet browser application, data files, and device drivers for controlling peripheral devices attached to computer 1, and floppy disk drive 7 for use in reading data from and writing data to floppy disks inserted therein. Data and/or applications may also be accessed from a CD-ROM via a CD-ROM drive (not shown) or over a network to which computer 1 may be connected (network connection not shown).

Also shown in FIG. 1 are printer 8 and projector 14. As is discussed in more detail below, printer 8 and projector 14 are target output devices having a gamut that differs from the gamut of colors displayable by monitor 2. While printer 8 and projector 14 are shown as being directly connected to computer 1, they need not be. They may be connected via a network (e.g., wired or wireless network, not shown), for example.

Figure 2:
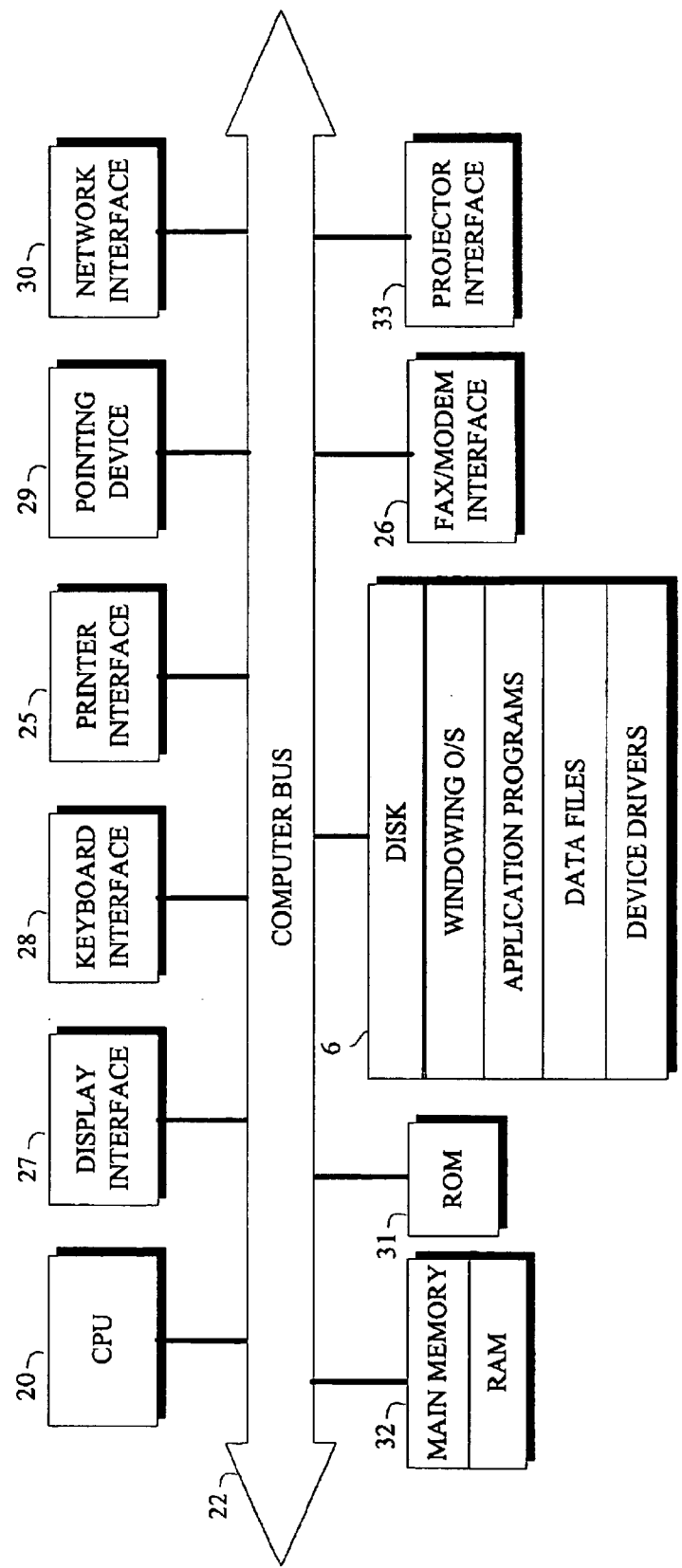
FIG. 2 is a block diagram of the internal architecture of a personal computer for use in conjunction with the present invention.

FIG. 2 is a block diagram of the internal architecture of computer 1. Shown in FIG. 2 are CPU 20, which is preferably a Pentium-type microprocessor but need not be, interfaced to computer bus 22. Also interfaced to computer bus 22 are printer interface 25, to allow computer 1 to communicate with printer 8, projector interface 33 to allow computer 1 to interface with projector 14, modem interface 26 to enable communications between computer 1 and its internal modem, display interface 27 for interfacing with display monitor 2, keyboard interface 28 for interfacing with keyboard 4, and mouse interface 29 for interfacing with mouse 5. Modem interface 26 and/or network interface 30 may be used to connect to a network (e.g., Internet, local area network, wide area network, etc.).

Read only memory (ROM) 31 stores invariant computer-executable program code, or program or process steps, for basic system functions such as basic I/O, start up, or reception of keystrokes from keyboard 4.

Main random access memory (RAM) 32 provides CPU 20 with memory storage which can be accessed quickly. In this regard, computer-executable program code, or program or process steps, are transferred from disk 6 over computer bus 22 to RAM 32 and executed therefrom by CPU 20.

Also shown in FIG. 2 is disk 6 which, as described above, includes a windowing operating system, as well as applications such as word processing, spreadsheet, presentation, graphics, image processing, gaming, etc. applications. One or more of the applications is capable of displaying a document having colored objects on a working output device and which outputs the document to a target output device having a color gamut that differs from that of the working output device. Such an application uses the user interface of the present invention to allow a user to select in-gamut colors of the target device as described herein. Disk 6 further includes data files and device drivers as shown.

Program code, or program or process steps, configured to generate a user interface according to the present invention as well as the applications, or other program code, need not be stored on disk 6. Other storage may be used such as the CD-ROM discussed above. In addition, code may be downloaded from a network (e.g., the Internet).

FIGS. 1 and 2 illustrate one example of a computing system that executes program code, or program or process steps, configured to generate a user interface wherein a user can select from among multiple different colors, and in which for selectable ones of the colors, only colors in-gamut for the target output device are displayed. Other types of computing systems may also be used as well.

In one aspect of the invention, the user interface is usable with an application program which displays documents having colored objects on a working output device and which outputs the document to a target output device having a color gamut that differs from that of the working output device. The user interface permits user selection from multiple different colors, and includes a region that displays multiple different selectable colors or colored objects, wherein for such selectable colors or colored objects, only in-gamut colors are displayed.

As is discussed in more detail below, a colored object, for which only in-gamut colors are displayed, may comprise a document containing colored objects or other colored objects such as clip art, for example. A template or clip art object comprises one or more colors, and for selectable templates or clip art only in-gamut colors are displayed.

The colors that are displayed in the user interface for a target device might be obtained through gamut mapping based on a device profile for the target output device, or it might be a generalized gamut representative of common output devices.

Figure 3:
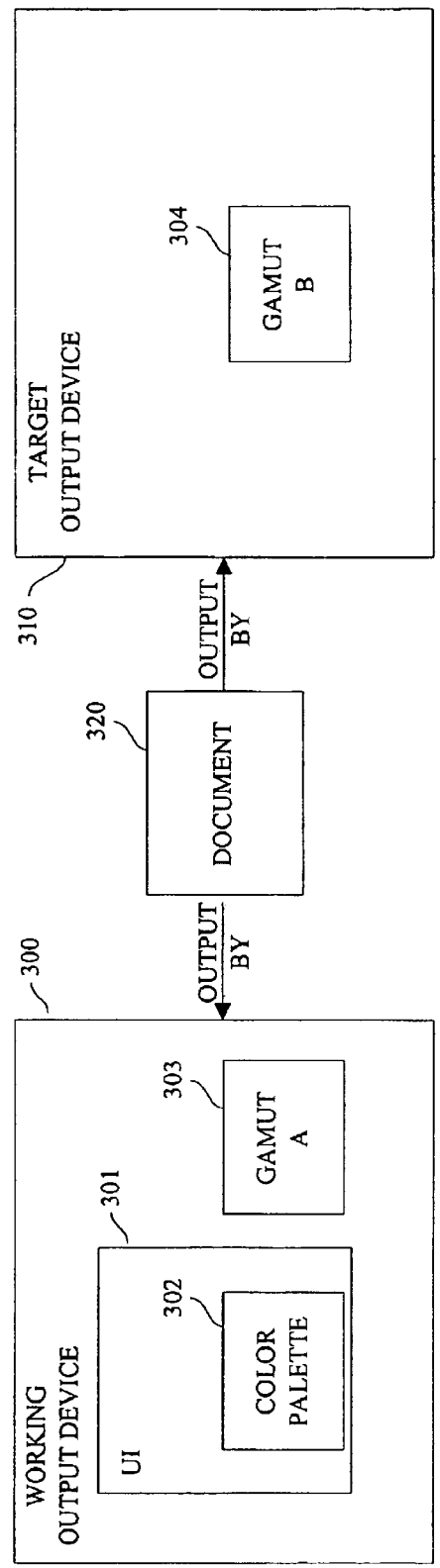
FIG. 3 provides an exemplary use of the user interface with working and target devices according to the present invention.

FIG. 3 provides an exemplary use of the user interface with working and target devices according to the present invention. Working output device 300 is an output device, such as a CRT monitor or LCD display, which the user uses to create his document (e.g., document 320). Working device 300 might be display monitor 2 that is controlled by program code executing on computer 1, for example. Target output device 310 is an output device (such as a printer 8 or projector 14) for document 320. Working device 300 has a gamut, gamut 303, which is different from the gamut of colors, gamut 304, of target output device 310.

Working device 300 displays user interface 301, which includes region 302, that displays multiple different selectable colors in gamut 304, or selectable colored objects whose colors are in gamut 304, of target output device 310. In addition, color palette 302 may include one or more other colors, such as colors out-of-gamut for target output device 310, which are not selectable by the user. User interface 301 may include a checkbox (not shown) that allows the user to control the inclusion of such out-of-gamut colors, and/or unselectable colors.

Document 320, which has colored objects, is displayed on working output device 300 by an application program (not shown in FIG. 3). Using user interface 301, a user can select colored objects or colors for the colored objects of document 320. More particularly, the user can select colors that are within the gamut of target output device 310. In so doing, the user is able to determine whether the colors are acceptable to him prior to the output of document 320 by target output device 310.

According to one aspect of the invention, user interface 301 comprises a color picker that displays colors and allows the user to view colors as they will appear at a target output device. While the user interface can display colors out-of-gamut for the target output device, the colors that are selectable by the user are displayed in the user interface in their in-gamut appearance. The user therefore knows at the time of selection whether the colors are acceptable to him.

A color picker can use a color palette as one technique to display colors that a user may choose for the color objects of document 320. There are other techniques such as a custom color picker, templates and clip art, for example. Like the color palette, a custom color picker allows the user to select a specific color, while templates and clip art contain a preselected palette of colors. The custom color picker, templates and clip art are discussed below.

Figure 4:
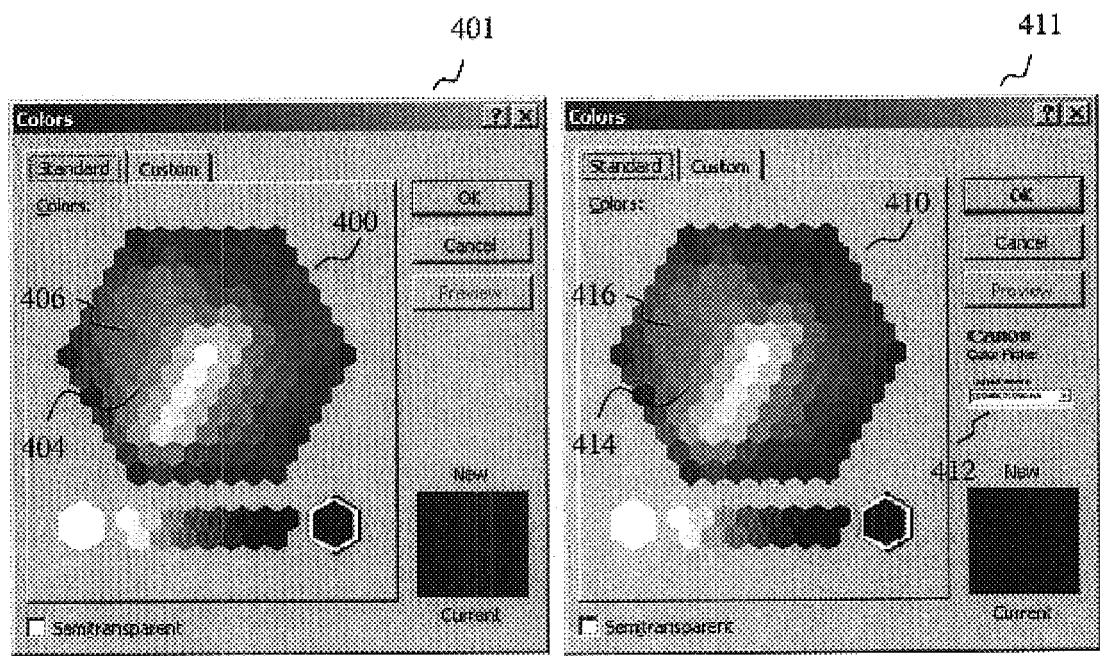
FIG. 4 provides an example of a display in a user interface according to the present invention, in which a color palette is used to display in-gamut colors of an output device for selection by a user.

FIG. 4 provides an example of a display in a user interface according to the present invention, in which a color palette is used to display in-gamut colors of an output device for selection by a user. More particularly, FIG. 4 provides examples of color palettes for working output device 300 and target output device 310, respectively.

Color palettes, such as those depicted in FIG. 4, have multiple different colors from which a user can select a color for colored objects. In FIG. 4, color palette 400 comprises 144 color selections in a color hexagon having 127 selections and a gray ramp having 17 selections. Color palette 400 represents a standard palette with highly saturated colors that might be used by a working output device 300 such as monitor 2. For example, the greens in palette area 404 and the blues in palette area 405 are vibrant, saturated colors. In contrast, color palette 410 represents a palette of target output device 310, in which the greens in palette area 414 and the blues in palette area 415 appear to be more subdued, less saturated colors.

Using the present invention, one or more of the colors of color palette 400 may be modified to generate color palette 410, which includes colors within the gamut of target output device 310 selectable by the user. Color palette 410 is displayed in pane 411 of user interface 301, all of which may be displayed from within an application program. If a user selected one of the greens from palette area 404 of color palette 400 on working output device 300, he might be disappointed with the less saturated green from palette area 414 of color palette 410. However, if the user is instead able to select from the colors in palette 410 that are in the gamut of target output device 310, more desirable colors can be selected for output by target output device 310.

In addition to color palette 410, pane 411 includes a designation region 412 for designating target output device 310. In pane 411, designation region 412 comprises a pull down menu that is capable of displaying multiple different instances of target output device 310 when pulled open, and the selected instance of target output device 310 otherwise. It should be apparent that other user interface components (e.g., text field with validation, etc.) may be used with the present invention to allow the user to specify an instance of target output device 310 and/or to display the current selection or a default.

Figure 5:
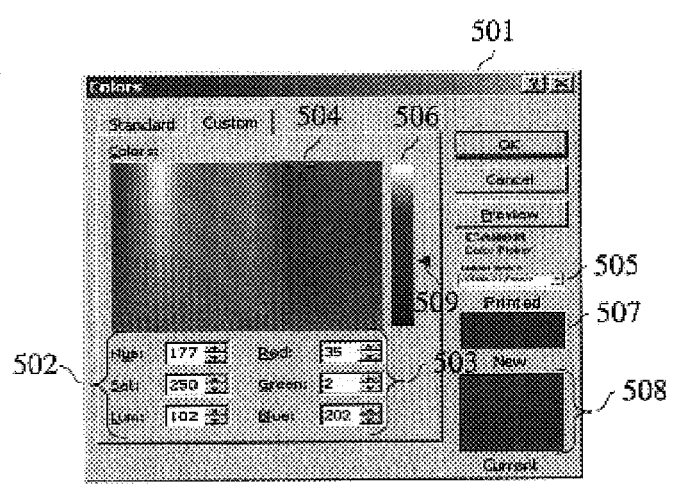
FIG. 5 provides another example of a display in a user interface according to the present invention, in which colors both within and outside the gamut of a target output device are displayed according to the present invention.

Pane 411 of FIG. 4 provides one example of a display of user interface 301 for use in displaying colors of the target output device 310 for selection. FIG. 5 provides another example of a display for use with user interface 301 in which colors within the gamut of target output device 310 are displayed according to the present invention. In FIG. 5, user interface 301 displays both in-gamut and out-of-gamut colors of target output device 310. However, as with the color palette of FIG. 4, the selectable colors are those within gamut 304 of target output device 310.

Further, as in pane 411 of FIG. 4, pane 501 of FIG. 5 includes a designation region, i.e., region 505, that allows the user to designate an instance of target output device 310.

Pane 501 depicts a custom color selection user interface, wherein colors can be specified as RGB (Red, Green and Blue) component values using RGB fields 503 or in HSV (Hue, Saturation and Value) component values using HSV fields 502. In addition, a user may use a pointing device (i.e., a mouse 5) to specify a color using point-and-click fields 504 and fine tune the selection in point-and-click region 504 by sliding arrow 509 along slider 506.

A color specified using input fields 502 to 506 and/or 506 may not be in gamut 304. However, a color derived from the specified color is within gamut 304, and may be selected by the user. Based on the user's color specification input, region 507 of pane 501 displays a selectable color that is within the gamut of the instance of target output device 310 displayed in designation region 505.

While it is possible to restrict the user's color specification within input fields 502 to 504 and 506, such an approach could result in a non-intuitive color selection. Accordingly, it is considered preferable to allow the user to specify a color unconstrained by whether or not the color is within the gamut of the designated instance of target output device 310, and to display an in-gamut color, in display 507, based on the user's specified color.

Whether or not user interface 301 displays only colors that are in-gamut for target output device 310 as in the example of FIG. 4, or displays both in-gamut and out-of-gamut colors as in the example of FIG. 5, in-gamut colors are preferably obtained through gamut mapping using a device profile for the target output device. Gamut mapping in this instance is most readily performed through a color look-up table. Alternatively, other techniques might be employed for obtaining the in-gamut colors. One such other technique, for example, might be use of a representative gamut for common output devices, which is roughly representative of the actual target output device without being specific to it.

A representation of the gamut boundary associated with a target output device 310 can be used to determine whether a color is in-gamut for the target output device 310. An International Color Consortium (ICC) device profile associated with target device 310 may contain a table that can be used to determine whether a color is in or out of gamut. However, the table is an optional portion of a device profile.

As an alternative, a mountain range gamut descriptor (MRGD) table may be used. An article by Gustav J. Braun and Mark D. Fairchild, entitled "Techniques for Gamut Surface Definition and Visualization", *Proceedings of the Fifth Color Imaging Conference*, 1997, which is herein incorporated by reference, describes an MRGD table in further detail.

The MRGD table uses an LCh (Lightness, Chroma and Hue) color space definition of a color, and stores a maximum chroma value corresponding to a lightness and hue value pair. In other words, a lightness and hue value pair is used as an index (comprising two values) into a two-dimensional MRGD to retrieve a maximum chroma value. Given a color represented in terms of lightness, chroma and hue values, the lightness and hue values are used to retrieve a maximum chroma value from the MRGD table, and the retrieved chroma value is then compared with the chroma value to determine whether or not the LCh-defined color is within gamut. If the color's chroma value exceeds the chroma threshold indicated in the table, the color is consider to be out-of-gamut, and considered to be in-gamut otherwise.

As is discussed in the Braun and Fairchild article, the MRGD table can either be fully populated or can be lesser populated. In the latter case, interpolation is used to find intermediate values.

Figure 6:
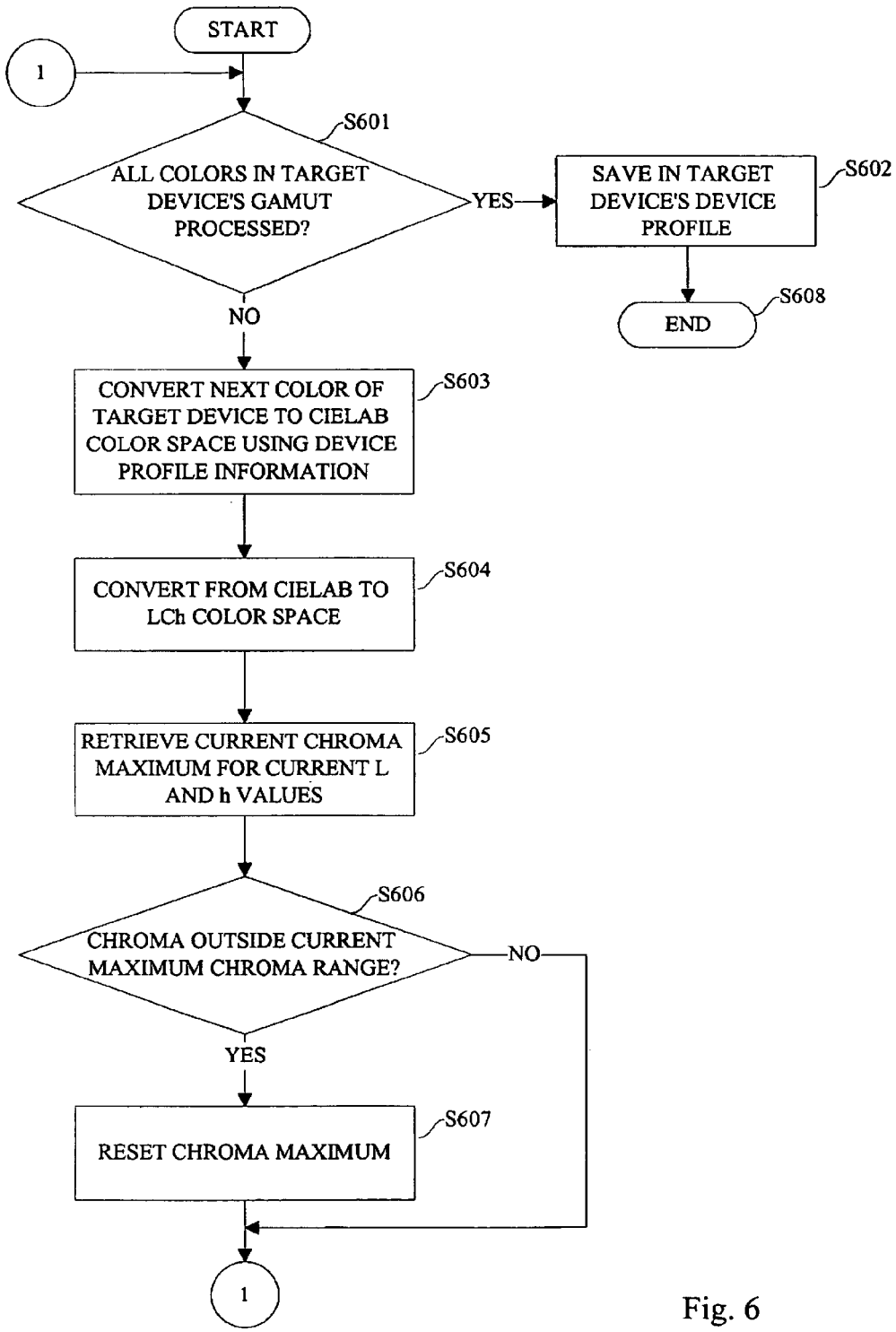
FIG. 6 illustrates a flow diagram of process steps to generate a MRGD table for use in determining a device's gamut boundary according to the present invention.

FIG. 6 illustrates a flow diagram of process steps to generate a MRGD table for use in determining a device's gamut boundary according to the present invention. Briefly, the MRGD table can be generated using information contained in an ICC device profile. That is, a device profile for output devices other than RGB devices supports an AToB1 tag, which is a lookup table (LUT) that provides a colorimetric mapping of device coordinates from device-dependent color space, such as CMYK (Cyan, Magenta, Yellow and Black) color space, to CIELAb color space. Other information such as matrix and tone reproduction curve tags of the device profile can be used to perform such a mapping. From the CIELAB color space, a color can be converted to LCh space (i.e., a conversion from rectangular to cylindrical coordinates).

At step S601 of FIG. 6, a determination is made whether all of the colors of target output device 310 have been processed. If so, processing continues at step S602 to save the MRGD table in the device profile of target output device 310, and processing ends at step S606. If there are remaining colors to be processed, processing continues at step S602 to convert the next device-dependent color of target output device 310 to CIELAB color space, e.g., using the information contained in the target output device 310 such as the AtoB1 tag of the device profile.

At step S604, the CIELAB color component values generated in step S604 are converted to LCh color space. At step S605, a maximum chroma value corresponding to values L and h is retrieved from the MRGD table. If a value has not previously been set in the table (e.g., the MRGD table value is zero), the C chroma value generated in step S604 becomes the new maximum chroma value in the MRGD table. At step S606, a determination is made whether the chroma value generated in step S604 is within the chroma maximum value retrieved from the MRGD table. If so, processing continues at step S601 to process any remaining colors of target output device 310.

If the generated chroma value is determined to exceed the retrieved maximum chroma value (i.e., the chroma value retrieved from the MRGD table in step S605), processing continues at step S607 to reset the maximum chroma value in the table to a new maximum chroma, i.e., the C chroma value generated in step S604. Processing then continues at step S601 to process any remaining colors of target output device 310.

Once it is determined, at step S601, that all of the colors of target output device 310 have been processed, processing continues at step S602 to save the MRGD table as a tag in the device profile information of target output device 310. By storing the table as part of the device profile of target output device 310, processing time and resources can be reduced, since it won't be necessary in most instances to re-generate the MRGD table for target output device 310.

The MRGD table can be used to determine whether a color is within the gamut of target output device 310. For example, in FIG. 5, if a color is specified using fields 502 to 504 and/or 506, the color that is displayed in region 507 is based on a determination, using the MRGD table, of whether the color is in-gamut for target output device 310. Referring to FIG. 4, for example, colors that are displayed in region 410 are within the maximum chroma value stored in the MRGD table.

Figure 7:
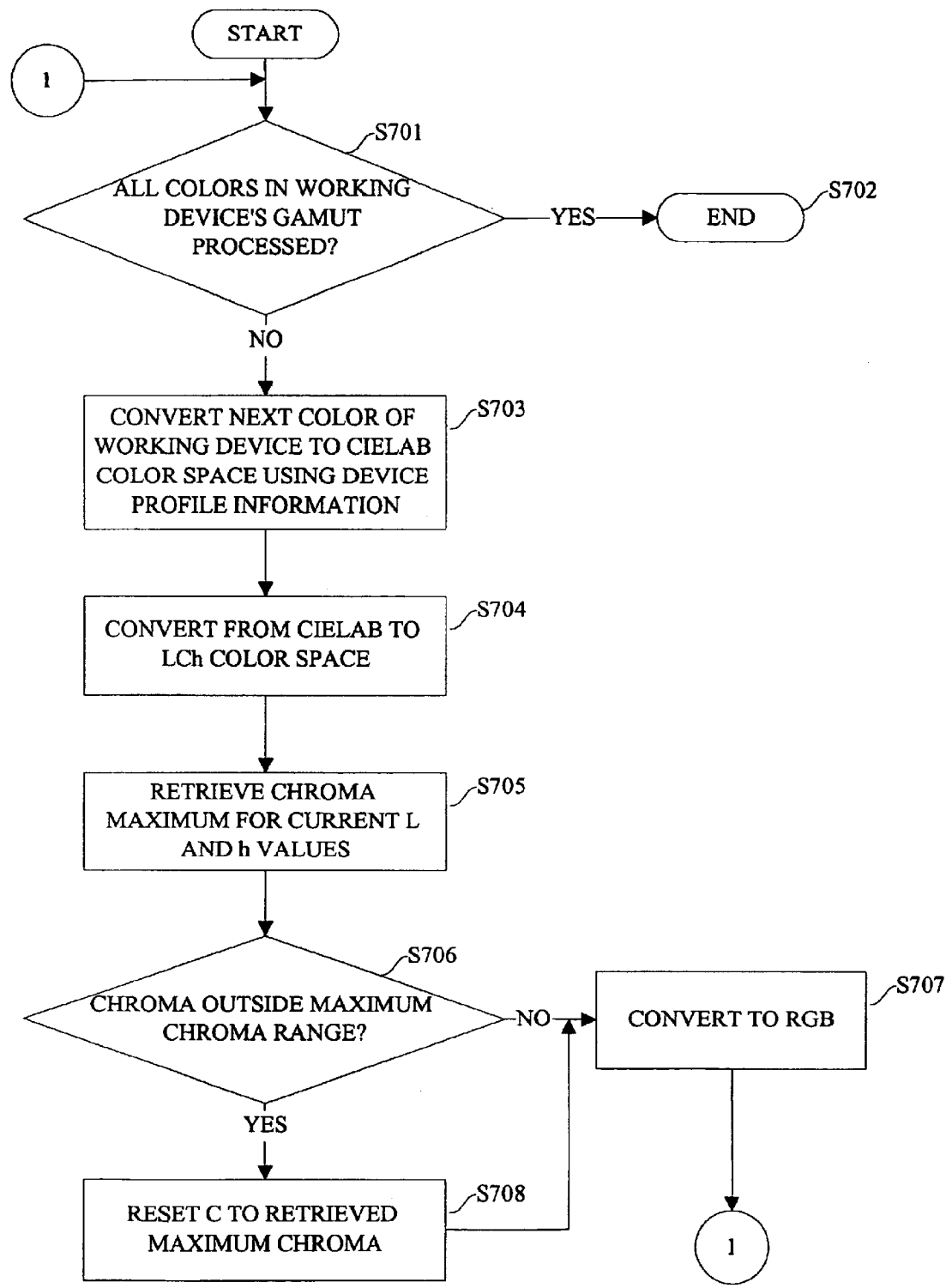
FIG. 7 illustrates a flow diagram of process steps for mapping the gamut of colors of a working output device to a target output device's gamut of colors according to the present invention.

According to the present invention, colors in gamut 303 of working output device 300 are mapped to colors in gamut 304 of target output device 310. FIG. 7 illustrates a flow diagram of process steps for mapping the colors of working output device 300 to colors of target output device 310 according to the present invention.

Briefly, to map colors in gamut 303 of working output device 300 to colors in gamut 304 of target output device 310, it is first determined whether a color in gamut 303 of working output device 300 is within gamut 304 using the MRGD table. If so, the gamut 303 color is mapped directly to the color in gamut 304 without further processing. However, if there is no corresponding color in gamut 304 for the gamut 303 color, the gamut 303 color is "clipped" to gamut 304 using any one of a number of known clipping techniques. For example, one technique, which is used in FIG. 7, is to clip the gamut 303 color by clipping the chroma component of an LCh color to the maximum chroma value associated with the L and h values. Instead of clipping a color that is outside gamut 304, the color can be designated as an unselectable color, to make the color unavailable for selection by the user in user interface 301.

Referring to FIG. 7, step S701, a determination is made whether all of the colors of working output device 310 have been processed. If so, processing ends at step S702.

However, if colors of gamut 303 still remain to be processed, processing continues at step S703 to convert the next color of gamut 303 to CIELAB color space using the device profile information (e.g., ATOB1 tag or matrix and tone reproduction curve tags) of working output device 300. At step S704, the CIELAB component values are converted to LCh values.

At step S705, a maximum chroma corresponding to the generated L and h values is retrieved from the MRGD table.

That is, the L and h values are used as an index into the gamut descriptor table to retrieve a maximum chroma value corresponding to the L and h values. As discussed above, interpolation may be used to generate a maximum chroma value in a case that the MRGD table is not fully populated.

At step S706, a determination is made, using the maximum chroma value corresponding to the L and h values that were generated in step S704, whether the gamut 303 color is within gamut 304 of target output device 310. More particularly, at step S706 the chroma value generated at step S704 is compared with the maximum chroma value retrieved from the MRGD table at step S705. If the generated chroma value is determined to be within gamut 304 based on the retrieved maximum chroma value, processing continues at step S707 to convert the LCh value of the gamut 303 color, which is also the gamut 304 color, back to RGB color space. Alternatively, before converting the RGB color to CIELAB color space in step S703, the gamut 303 RGB color can be stored and retrieved at step S707 thereby avoiding a conversion operation, if desirable. In any event, processing then continues at step S701 to process any remaining colors in the gamut of working output device 300.

If it is determined, at step S706, that the gamut 303 color is not within the range of the retrieved maximum chroma, processing continues at step S708, to replace the generated chroma value with the retrieved maximum chroma value that corresponds to the L and h values. At step S707, the color defined by L, maximum chroma, and h is then converted to RGB color space. Processing continues at step S701 to process any remaining colors of working output device 300.

In the example of FIG. 7, colors in gamut 303 are mapped to colors in gamut 304. It should be obvious to one skilled in the art that a lookup table (e.g., a multi-dimensional lookup table) can also be constructed, using the process steps of FIG. 7, to map the colors of gamuts 303 and 304. By constructing such a lookup table, processing could be made faster, since steps S703 to S708 of FIG. 7 are performed once for each color in gamut 303 to identify a mapping between gamuts 303 and 304, which can be used to construct the lookup table. Since the mapping information is stored in the lookup table, the lookup table can be consulted to map colors in gamuts 303 and 304 rather than repeating the process steps of FIG. 7.

In the color picker examples of FIGS. 4 and 5, user interface 301 displays in-gamut colors in the selection process. That is, in FIG. 4, color palette 410 preferably includes those colors that are in-gamut for target output device 310. In the color picker example of FIG. 5, the display region 507 displays the gamut 304 color associated with the color specified in fields 502 to 504 and/or 506. That is, the application program responds to color selection from the user interface by displaying colors as they might otherwise appear on working output device 310. This arrangement of displaying a color as it might appear on working output device 310 is preferred since the overall user experience is much closer to WYSIWYG, and does not cause user confusion that might otherwise result if a user selects an in-gamut color which suddenly appears differently when viewing the color document on the working output device.

Other examples of "color picking" can be performed in the selection of a template and/or clip art within user interface 301. That is, one or more of the color objects in document 320 can comprise clip art. In addition, document 320 may have been created from a template that comprised one or more colored objects. According to the present invention, it is preferred in order to provide a WYSIWYG experience that gamut 304 colors be used to display colored objects in templates and/or clip art that are selectable by the user. By doing so, the user is able to make a selection with a sense of how the template or clip art will appear when output by working output device 310.

FIG. 8 depicts templates each using in gamut colors of a target output device and each having an associated color palette of colors displayable in user interface 301 for selection by the user according to the present invention. Pane 811 is displayed in user interface 301. Pane 811 includes designation area 805 for designating an instance of target output device 310.

Panes 801 and 811 include template selection areas 806 and 816, respectively. Template selection area 806 displays templates using gamut 303 of working output device 300 while template selection area 816 displays templates using gamut 304 of target output device 310.

Template selection area 806 is shown in FIG. 8 to illustrate differences in the colors of gamuts 303 and 304. For example, template 804, which is displayed using colors from gamut 303 of working output device 300, and template 814, which is displayed using colors from gamut 304 of target output device 310 appear different. The background color in template 804 has a deeper, richer appearance and is noticeably different than the more subdued background of template 814.

According to one or more aspects of the present invention, template 814 is displayed in user interface 301 instead of template 804, thereby avoiding selection template 804 and colors outside gamut 304 of target output device 310. Template 814 can also have an associated palette of colors from which the user can select, which are within gamut 304. Thus, the user is prevented from selecting template 804 as well as colors that are outside the gamut of target output device 310. As a result, the user is less likely to be disappointed by the background generated by target output device 310.

Using the present invention, a set of templates appropriate for the output device are displayed in template selection area 816, the background colors as well as a palette of colors of each falling within gamut 304 of target output device 310. In so doing, user interface 301 can produce a WYSIWYG effect.

A similar approach can be taken with respect to clip art. Clip art is generally stored in a metafile. In the Windows operating system, for example, the metafile describes a sequence of GDI (Graphic Device Interface) calls. By playing the metafile, the sequence of GDI calls is repeated and the clip art drawing is recreated. A metafile stores colors in a logical palette, which is created by calls defined within the metafile. It is possible to edit these calls in the metafile before playing it. It is therefore possible to detect the palette entries and map them to gamut 304 of target output device 310 before playing the metafile.

The colors defined by the calls in the metafile can be mapped to gamut 304 in a manner similar to that described in steps S603 to S607 of FIG. 6 for each of the colors defined in the metafile, for example.

Techniques other than metafiles and/or GDI calls might be used (e.g., in operating systems other than the Windows operating system) to define clip art. However, it should be apparent that a clip art definition other than the exemplary metafile described herein could be modified to reflect colors within gamut 304 of target output device 310, which are identified using the present invention.

Referring to FIG. 9, which illustrates clip art which has been modified so that the clip art colors fall within gamut 304 of target output device 310 according to the present invention. A comparison of the clip art depicted in pane 903, in which the clip art colors are from a first gamut (e.g., gamut 303), and the clip art in pane 913, in which the colors are from a different gamut (e.g., gamut 304), illustrates some differences that may exist between the two gamuts.

For example, backgrounds 906 and 907 of clip art 905 differ noticeably from backgrounds 916 and 917 of clip art 915. Background 916 has more of a brown tint to it than background 906, and background 917 appears to be more purple in color while background 907 appears to be blue. In such a case, the user could be disappointed if he selected clip art 905 based on the gold and blue backgrounds depicted in pane 903, and clip art 915 was generated by target output device 310 instead of clip art 905.

Accordingly, it is preferable to allow the user to select clip art in pane 913 of user interface 301 which includes only those colors that are in gamut 304 of target output device 310.

Since user interface 301 includes an area for designating target output device 301 (e.g., designation areas 412, 505, 805 and 901 of FIGS. 4, 5, 8 and 9, respectively), it is possible that the user may select one target output device 310, select colors within gamut 304 of target output device 310, and subsequently select a different target output device 310, which has a different gamut 304. In such a case, colors selected for the first target output device 310 selection may no longer be in-gamut for the subsequently-selected target output device 310.

In order to address those colors that are out-of-gamut colors once the second target output device 310 is selected, the colored objects in document 320 can be re-rendered to map the colors of the colored objects to the gamut 304 of the second target output device 310. The mapping might map the original colors (i.e., the color defined prior to mapping to the first target output device 310) to the new gamut 304, or might map the colors previously mapped to the first-selected target output device 310 to colors in gamut 304 of the second-selected target output device 310, for example.

Alternatively, only those colors that are rendered after the second target output device 310 is selected are mapped to the subsequently selected target output device's gamut 304.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A user interface for an application program which displays a document having colored objects on a working output device and which outputs the document to a target output device having a color gamut that differs from that of the working output device, said user interface comprising:
    target output device setting portion for use in setting a type of target output device; and
    colored object selecting portion for use in selecting a colored object from multiple different colored objects, comprising a region that displays multiple different colored objects of which at least some of the colored objects are selectable, wherein the selectable colored objects consist of only in-gamut colors of the target output device.

2. A user interface according to claim 1, wherein said target output device setting portion is operable to select from among plural different types of target output devices.

3. A user interface according to claim 1, wherein the target output device is a color printer or projector.

4. A user interface according to claim 1, wherein the in-gamut colors are obtained by gamut mapping based on an output profile of the target output device.

5. A user interface according to claim 1, wherein for colored objects whose colors were selected by the user interface, the application program displays the document on the working output device using colors in-gamut of the target output device.

6. A method of generating a user interface for an application program which displays a document having colored objects on a working output device and which outputs the document to a target output device having a color gamut that differs from that of the working output device, said method comprising:
    displaying a target output device setting portion for use in setting a type of target output device; and
    displaying, in a colored object selecting portion for use in selecting a colored object from multiple different colored objects, a region that displays multiple different colored objects of which at least some of the colored objects are selectable, wherein the selectable colored objects consist of only in-gamut colors of the target output device.

7. A method according to claim 6, further comprising receiving selection input from said target output device setting portion, the selection input selecting from among plural different target output devices.

8. A method according to claim 6, wherein the target output device is a color printer or projector.

9. A method according to claim 6, further comprising obtaining in-gamut colors by gamut mapping based on an output profile of the target output device.

10. A method according to claim 6, wherein for colored objects whose colors were selected by the user interface, displaying, by the application program, the document on the working output device using colors in-gamut of the target output device.

11. A computer-readable memory medium in which computer-executable process steps are stored, the process steps for generating a user interface for an application program which displays a document having colored objects on a working output device and which outputs the document to a target output device having a color gamut that differs from that of the working output device, said process steps comprising:
    a displaying step of displaying a target output device for use in setting portion for setting a category of target output device; and
    a displaying step to display, in a colored object selecting portion for use in selecting a colored object from multiple different colored objects, a region that displays multiple different colored objects of which at least some of the colored objects are selectable, wherein the selectable colored objects consist of only in-gamut colors of the target output device.

12. Computer-executable program code stored on a computer readable medium, said computer-executable program code for generating a user interface for an application program which displays a document having colored objects on a working output device and which outputs the document to a target output device having a color gamut that differs from that of the working output device, said computer-executable program code comprising:

code to display a target output device setting portion for use in setting a type of target output device; and code to display, in colored object for use in selecting portion which selects a colored object from multiple different colored objects, a region that displays multiple different colored objects of which at least some of the colored objects are selectable, wherein the selectable colored objects consist of only in-gamut colors of the target output device.

13. An apparatus for generating a user interface for an application program which displays a document having colored objects on a working output device and which outputs the document to a target output device having a color gamut that differs from that of the working output device, said apparatus comprising:

a program memory for storing process steps executable to display a target output device setting portion for use in setting a of target output device, and to display, in colored object selecting portion for use in selecting a colored object from multiple different colored objects, a region that displays multiple different colored objects of which at least some of the colored objects are selectable, wherein the selectable colored objects consist of only in-gamut colors of the target output device; and a processor for executing the process steps stored in said program memory.

* * * * *